March 7, 1967 M. LEVINE 3,308,245

LOOP SENSING CIRCUIT

Filed Dec. 20, 1963 4 Sheets-Sheet 1

INVENTOR.
Michael Levine

BY C. A. Gullbrandsen

ATTY

March 7, 1967 M. LEVINE 3,308,245

LOOP SENSING CIRCUIT

Filed Dec. 20, 1963 4 Sheets-Sheet 2

INVENTOR.
Michael Levine

BY C. A. Gullbrandsen

ATTY.

LOOP SENSING CIRCUIT

Filed Dec. 20, 1963 4 Sheets-Sheet 3

INVENTOR.
Michael Levine
BY
C. A. Gulbrandsen
ATTY.

March 7, 1967 M. LEVINE 3,308,245

LOOP SENSING CIRCUIT

Filed Dec. 20, 1963 4 Sheets-Sheet 4

INVENTOR
Michael Levine

BY C. A. Gullbrandsen

ATTY.

United States Patent Office 3,308,245

Patented Mar. 7, 1967

3,308,245
LOOP SENSING CIRCUIT

Michael Levine, Chicago, Ill., assignor to Automatic Electric Laboratories, Inc., Northlake, Ill., a corporation of Delaware Filed Dec. 20, 1963, Ser. No. 332,208
7 Claims. (Cl. 179—27)

This case relates to a loop sensing circuit, and more particularly to a device that designates a change in condition of a set of communication conductors from a busy condition to an idle condition.

In the past, various devices have been known to perform a camp-on-busy function in order to designate the change of condition of a busy line in a telephone switching system. These devices are used to determine when a busy line becomes idle so that the line in question can then be tested by a wire chief, or the line in question can be accessed by another calling line. The prior art, however, has used relays or similar devices which would be operated in response to an operate path that included a separate control lead for the switching stages to the busy line to designate that the given line is busy.

The principal object of this invention is to provide a loop sensing circuit to perform a camp-on-busy function that is coupled to a busy talking path without interfering with the busy line for use in a communication switching system not having an available control lead extending through the switching networks.

According to the invention, a relay is connected in parallel with the conductors of the talking path to the busy line, rather than being connected to a control lead since the control leads are being used to hold the connection to the busy line. Furthermore, one of the inductors that provide current for the talking path is shunted with a resistor in order to reduce the impedance of the operate circuit for the loop sensing relay, thereby allowing the high-impedance loop sensing relay to operate in series with the direct current source that supplies the current to the busy line without causing interference with the busy line. After the relay is then operated, the shunt resistor is removed from the battery feed inductor as the relay can remain operated on a relatively smaller amount of current. Therefore, this relay remains operated until the busy line becomes idle to thereby provide a camp-on-busy function.

Other objects and features relate to a diode bridge arrangement to keep the loop sensing relay operated even though the battery potential on the busy line is reversed due to ringing current, different polarity battery-feed sources, or other reasons. Also, spark suppression is supplied to prevent any interference with the talking path upon the removal of the shunt resistor.

Figure 1:
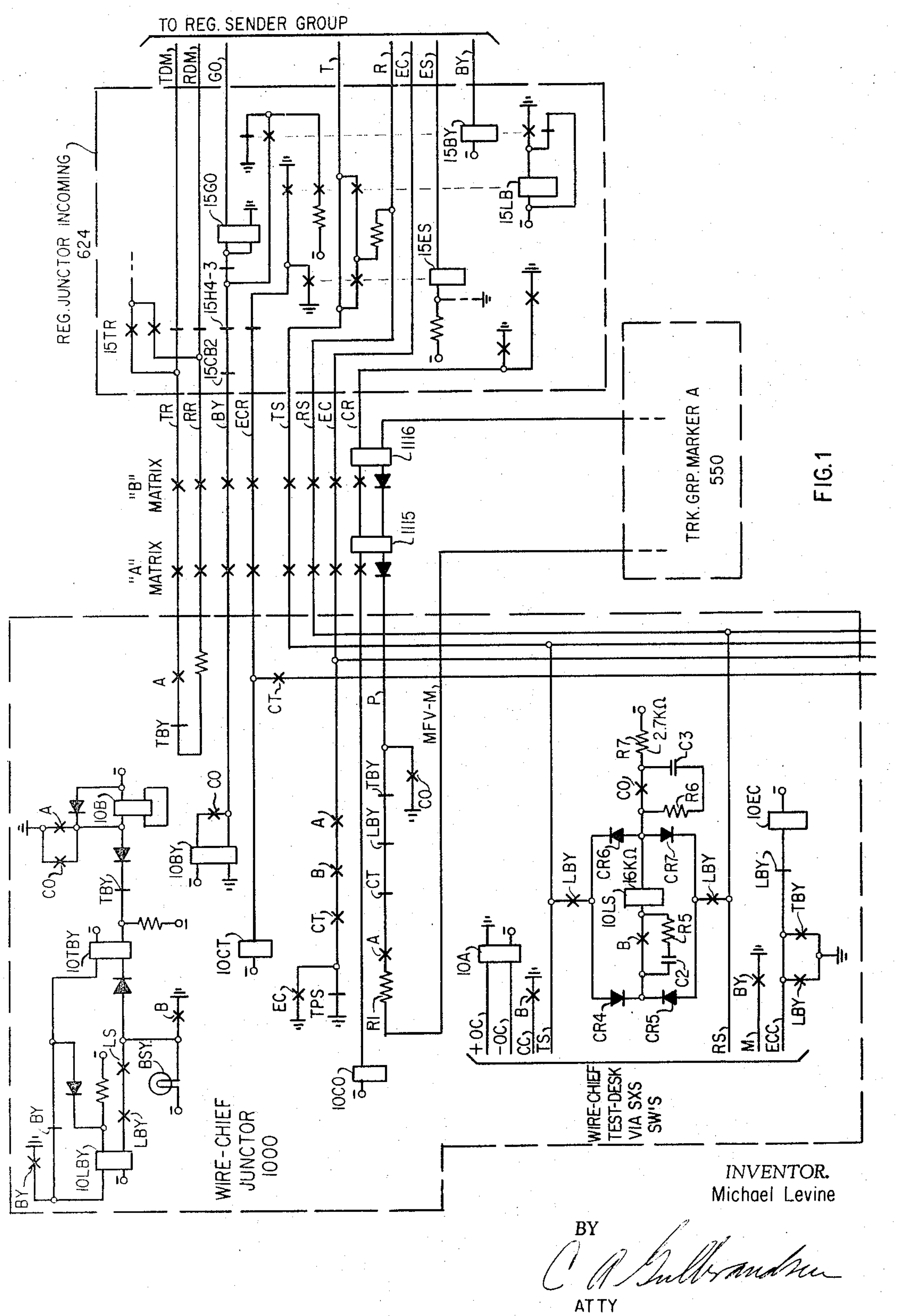
Figures 2, 5:
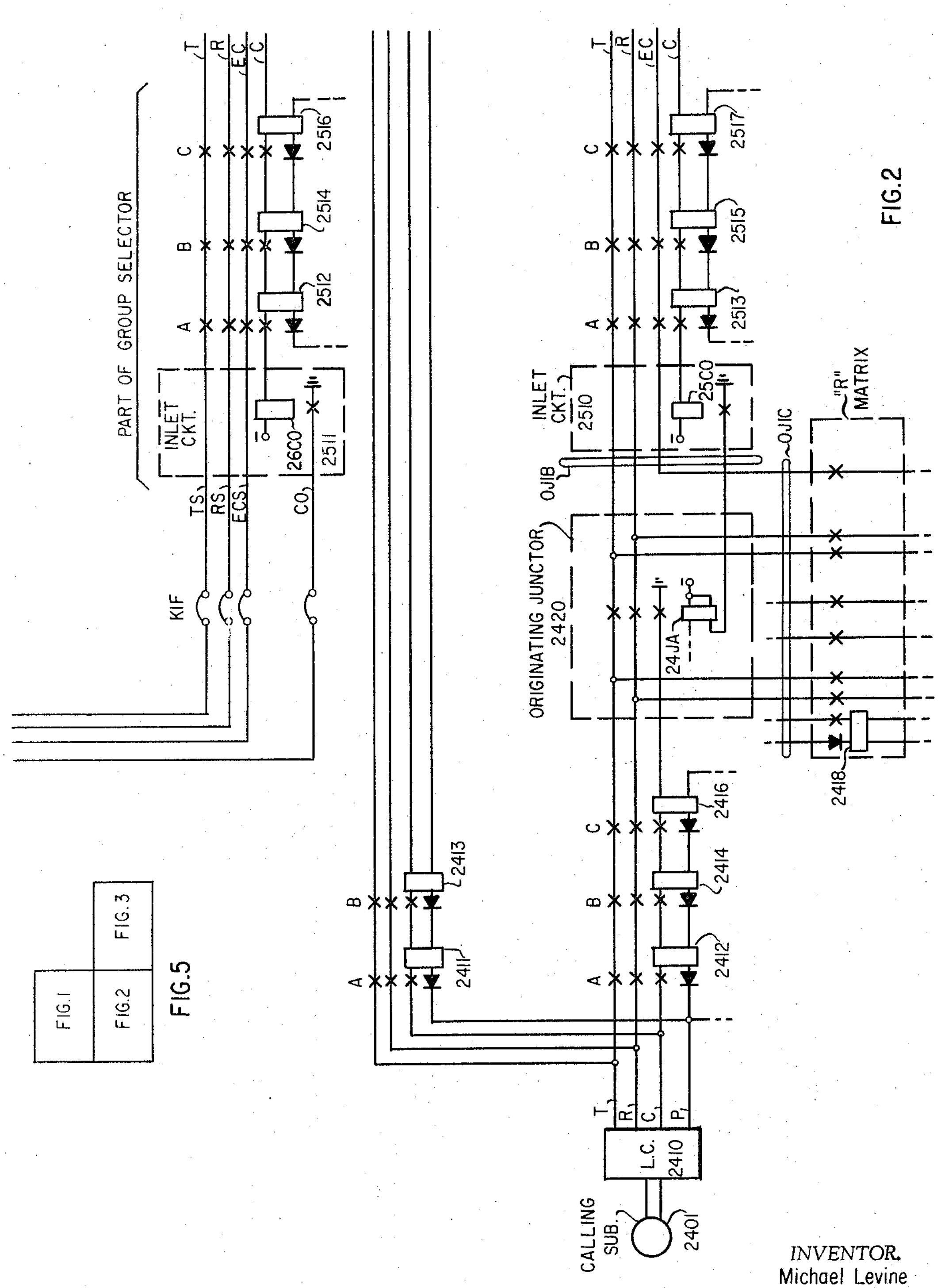
Figure 3:
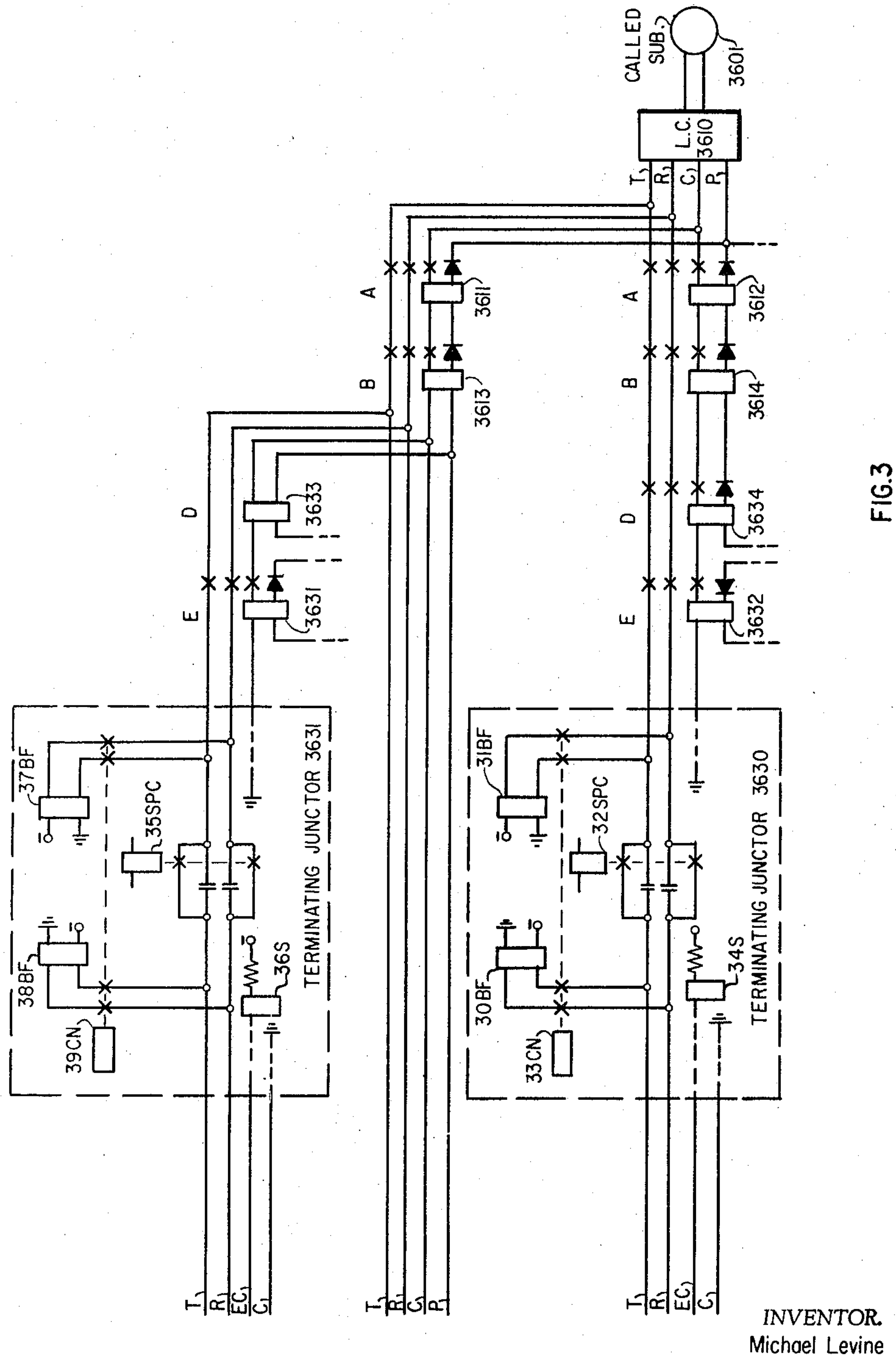
Figure 4:
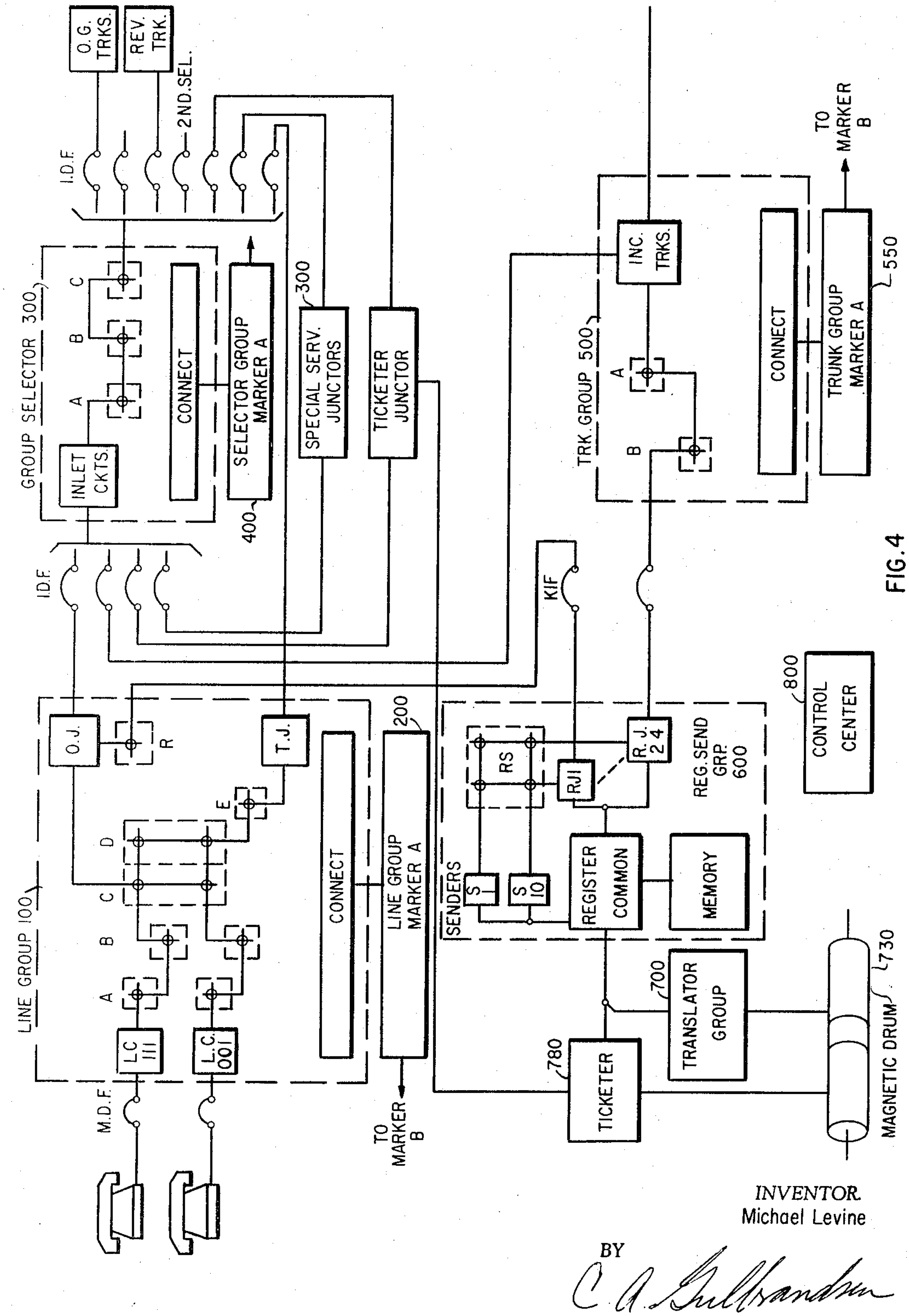

The above-mentioned and other objects and features of this invention and the manner of attaining them will become more apparent, and the invention itself will be best understood, by reference to the following description of an embodiment of the invention taken in conjunction with the accompanying drawings comprising FIGS. 1–5 wherein:

FIGS. 1–3 when arranged as shown in FIG. 5 comprise a call-through diagram and the wire chief junctor circuit; and FIG. 4 is a block diagram of a telephone switching exchange.

The system is explained according to the following outline:

Part 1. System organization
Part 2. Typical call
Part 3. Loop sensing circuit
Part 4. Operation

*Part 1. System organization*

The system consists of the line group 100, group selector 300, register-sender group 600, and the translator 700. There is also a trunk group 500 which provides access from incoming trunks to the registers, and a control center 800 which contains a special computer for operation analysis and recording, and program upgrading equipment. For further description of the system in general and the line group 100 the following pending United States patent applications may be referred to: K. K. Spellnes, Serial No. 230,887, now Patent No. 3,170,041, filed October 16, 1962; M. H. Esperseth, K. K. Spellnes, W. R. Wedmore, and F. B. Sikorski, Serial No. 240,497, now Patent No. 3,275,752, filed November 28, 1962; and W. R. Wedmore, Serial No. 304,892, filed August 27, 1963.

All of the electronic equipment is furnished in duplicate, for instance, two line group markers 200 may serve up to ten line groups and two group selector markers 400 may serve up to ten group selectors. A minimum of two register-sender groups 600 will be equipped per office and the translator 700, including the magnetic drum 730 and logic circuitry, will always be furnished in pairs per ten thousand directory numbers.

Time division techniques are used in the register-sender group 600 and in the translator 700. For further description of the register-sender group the following pending United States patent applications may be referred to: B. Sherstiuk, Serial No. 280,053, now Patent No. 3,-278,691, filed May 13, 1963; B. Sherstiuk, Serial No. 304,-827, now Patent No. 3,278,693, filed August 27, 1963; and D. Lee and H. Wirsing, Serial No. 308,112, filed September 11, 1963.

The markers are designed on an electronic basis and semiconductor circuitry is employed throughout the system. A ferrite core memory is used for temporary storage whereas the magnetic drum 730 is used for semipermanent storage.

The space division switching elements of the system consists of reed relay matrix assemblies in configurations of 10×6, 10×5 and 10×4. The crosspoints are made up of reed capsules and having normally two windings. They are mounted on a two layer printed card and the entire assembly constitutes a switching matrix. In some cases the cards are wired together to form a single larger matrix. The system contains no conventional telephone relays, but, similar functions are performed by reed relays. A reed relay assembly is essentially a cluster of magnetic reed elements controlled by coil windings and with or without a permanent magnet. For further description of the reed relay assemblies and cross-point matrix assemblies the following pending United States patent applications may be referred to:

E. J. Glenner and K. K. Spellnes, Crosspoint Switching Arrays( Serial No. 127,237, now Patent No. 3,188,423, filed July 27, 1961; G. S. Lychyk and A. Taliste, Dry Reed Relays, Serial No. 127,648, now Patent No. 3,128,356, filed July 28, 1961; P. K. Gerlach, G. J. David and R. O. Stoehr, Printed Matrix Board Assembly, Serial No. 132,-897, now Patent No. 3,193,731, filed August 21, 1961.

The electronic logic circuitry employs eight standard circuits as building blocks. These standard circuits include NOR gates, inverters, flip-flops, clocks, gated pulse amplifiers, parallel test circuit, parity circuit, and reed relay driver. All of these circuits are implemented on double or single-sided printed cards, 6 inches by 5½ inches.

The two switching stages, the line group and group selector may not necessary be installed in the same building. The line group may be remotely located and will then operate as a satellite office. No register-senders will be needed in the satellite, but a transceiver will provide for sending and receiving of switching information between the markers of the satellite and the register-senders in the main office.

The method of signaling between the system groups is accomplished by a technique called di-phase. This method employs a phase shift technique for serial sending and receiving of pulses.

The group selector may, in connections with the register-sender group and the translator, operate as a trunk tandem office and for this purpose the line group is not necessary. By using matrices with six reed capsules per crosspoint, this group selector marker may accommodate 4-wire switching.

The reason for this flexible operation of the system lies in the fact that the register-sender group, in connection with the storage in the translator, has sufficiently built-in features for the above described operation.

*Part 2. Typical call*

As an introduction to the system operation, a brief description of a typical local call is processed through the system is now presented. The block diagram may be followed for tracing the call.

When a subscriber lifts the handset, the line group marker 200 goes into action first by detecting the originating call mark, identifying the calling line, and selecting an idle register junctor within the register-sender. A path is then temporarily established from the calling telephone to the register junctor via the A, B, C, and R matrices, and the subscriber receives dial tone. The dialed digits are stored temporarily, coded, and processing is contined as these digits are passed to the translator 700, analyzed for type of incoming call, and instructions are selected from the drum memory 730 and returned to register-sender 600 to guide further handling of the call. Upon receipt of the remaining digits, the translator 700 returns switching instructions corresponding to the called number as stored in the drum memory 730. The instructions are transmitted from the register-sender 600 via one of the senders and the originating junctor of the originating line group to the group selector 300. In the group selector 300, the instructions are analyzed by the marker 400, an idle terminating junctor in the terminating line group is located, and a path established to that line group via the A, B, and C matrices of the group selector. The remaining instructions are followed by the line group marker to locate the called line terminals, select and seize a path from the terminating junctor through the E, D, B and A matrices to the called line. The terminating junctor establishes ringing, answer supervision, and talking battery for both parties when the call is answered.

Since the system is a common control operation, the markers of the line group and group selector function only to serve the assigned portion of the call processing then release to serve other calls. The register-sender 600 and the translator 700 are functioning on a time division basis and therefore are processing several calls simultaneously. The temporary signaling and control talking paths are held through the switching matrices and junctors.

*Part 3. Loop sensing circuit*

Referring now to FIGS. 1–3 as arranged as shown in FIG. 5, the wire-chief junctor circuit 1000, as shown in FIG. 1, provides access to the system from the wire-chief test desk via a step-by-step switch train and includes the loop-sensing relays 10LS. The wire chief can access the system in order to test a line; and furthermore the wire-chief junctor circuit includes relay 10LS to camp-on a busy line and to automatically cut-through when the line becomes idle. It can be noted that this relay 10LS can also be used in other types of junctor circuits to camp-on a busy line to automatically cut-through when the line becomes idle, establishing a new connection from another calling line to the line in question.

The wire-chief junctor circuit 1000 also seizes the trunk group marker 550 upon seizure of the wire-chief junctor to establish a connection to an idle register junctor. Thereupon, dial pulses are detected and then repeated to the register junctor to establish a connection to the called line via the group selector, terminating junctor, and thence to the line group. The wire-chief junctor also holds the terminating junctor and, therefore, the group selector matrix via the ECS lead.

Relay 10A is operated in response to the receipt of dial pulses which then repeats the dial pulses via leads TR and RR to the incoming register junctor 624. Relay 10CO is the control relay which operates when a connection is established to an idle register junctor. Relay 10BY is a differentially wound reed relay which operates in response to either a ground signal or a negative battery potential via lead BY from the register junctor, thereby designating either a trunk busy condition or a line busy condition respectively. Relay 10LBY operates and locks in response to relay 10BY during a line busy condition to connect relay 10LS across leads TS and RS. Therefore, relay 10LS remains connected across leads TS and RS even after the register junctor has released which causes relay 10BY to restore. Relay 10LS is the loop sensing relay which operates in series with the battery-feed relay for the busy line which is to be tested. This relay has a diode bridge associated with it so that the relay will operate even with different battery polarities present on leads T and R, i.e., ringing, etc. This relay remains operated as long as the line to be tested remains busy. Once the busy line becomes idle, relay 10LS restores and thereby causes relay 10LBY to restore. The restoration of relay 10LBY causes relay 10EC to operate and transmit a signal to the wire-chief test desk indicating that the line to be tested has become idle. Relay 10TBY is the trunk busy relay which designates that a trunk busy condition has occurred. Relay 10B operates in response to the operation of relay 10A upon seizure by the wire chief and remains operated so long as the wire chief junctor is seized. Relay 10CT is the cut-through relay which is operated when a connection is established to a register junctor and also when a connection is established to the line that is to be tested by means of the terminating junctor.

*Part 4. Operation*

FIGS. 1, 2 and 3 when arranged as shown in FIG. 5 comprise the wire-chief junctor and a call-through diagram which shows a typical connection from a local calling party to a local called party. These diagrams show that the wire-chief junctor can seize either a calling subscriber or a called subscriber to camp-on the busy line.

FIG. 2 shows an originating connection through a line group. The calling path extends from a calling party 2401 through his line circuit 2410 and crosspoints 2412, 2414 and 2416 of the line group switching matrices A, B and C respectively to an originating junctor 2420. From the originating junctor a connection extends via line OJ1B to the group selector, and also via line OJ1C and crosspoint 2418 of the R matrix to the register sender group. In the originating junctor 2420 the tip and ring conductors are split between the calling party and the group selector while there is a connection to the register-sender group for this call. Relay 24JA provides for holding the preceding switching train and supplying the busy indicating potential.

There is also shown typical paths through the group selector for a local call. The inlet circuit 2510 includes a cutoff relay 25CO. A local call may be extended via crosspoints 2512, 2514 and 2516 of the A, B, and C switching matrices.

In FIGURE 3, there is shown a typical terminating connection through a line group marker. The connection extends through a terminating junctor 3630, and crosspoints 3632, 3634, 3614 and 3612 of switching matrices E, D, B and A; thence through a line circuit 3610 to a called party 3601. During a typical local call, battery-feed relays 30BF and 31BF are connected to the tip and ring conductors to supply current for the talking path for the calling and called subscribers respectively. These battery-feed relays are connected to the tip and ring conductors via the contacts of relay 33CN. Relay 32SPC is a special relay which operates only during special calls that requires a metallic cut through path which short circuits the series capacitors in the tip and ring conductors. It should be noted at this point that a negative potential is connected to the tip conductor and a ground potential to the ring conductor for the calling subscriber; whereas, the reverse is true for the called subscriber.

Assume now that a local call has been established from calling subscriber 2401 to called subscriber 3601. Assume further that a wire-chief test is to be performed on the line to the calling subscriber 2401. It will become apparent that the wire-chief junctor could have alternatively selected the called subscriber 3601. The wire-chief junctor 1000 as shown in FIG. 1 is seized from the wire-chief test desk via a step-by-step switch train by causing relay 10A to operate. Relay 10A thereby causes relay 10B to operate and causes the trunk group marker 550 to pull the crosspoints for the A and B matrices by closing a circuit through the cross-points 1115 and 1116 of the A and B matrices via contacts of relays TBY, LBY, CT, and A in series with a resistor R1. After the crosspoints 1115 and 1116 have been operated a connection is established from the wire-chief junctor 1000 to the incoming register junctor 624 of the register-sender group. This idle register junctor will then cause relay 10CT and 10CO to operate once the connection has been established. Thereupon, the relay 10CO provides a ground on lead MFV-M to indicate to the trunk group marker that the connection has been established. Thereafter, the wire-chief test desk then dials the necessary digits to reach the calling subscriber 2401. Relay 10A repeats these dial pulses via leads TR and RR to the register junctor 624. These dial pulses are stored in the register-sender group and then translated. The switching digits are then sent via leads TS and RS to the KIF distributing frame and thence to the group selector. The connection is estalished through the group selector via crosspoints 2512, 2514 and 2516 to the terminating junctor 3631. The first three digits from the sender to the line group marker select the line terminal and the fourth digit is normally used for ringing control, but in this case it designates a special call. Since this is a special test call relay 35SPC is operated to provide the metallic cut-through path. The connection is further established to the line group switching stages via crosspoints 3631, 3633, 2413, and 2411 to the line circuit 2410 for the calling subscriber 2401. It is apparent at this point that a connection could be alternatively completed to called subscriber 3601 by the operation of crosspoints 3613 and 3611.

After this connection has been established, the terminating junctor determines that the calling subscriber 2401 is busy and thereupon returns a busy indication to the register-sender group. As a result, relay 15BY of the register junctor 624 is operated in such a manner that resistance battery is connected to lead BY to operate relay 10BY in the wire-chief junctor 1000, thereby designating a line busy condition. Since relay 10BY is a differentially-wound reed relay, it operates completely when a minus potential is applied to lead BY. Therefore, ground is applied to the upper winding of relay 10LBY to thereby operate relay 10LBY. Relay 10LBY connects relay 10LS to leads TS and RS. Relay 10LS is operated via the ground from relay 30BF of the terminating junctor 3630 via lead R through the switching stages, the contact of LBY, diode CR4, contacts of relay B and the winding of 10LS to the contacts of relay 10CO and thence to resistance battery. Relay LS operates and locks relay LBY. It is obvious at this point that if the called subscriber 3601 had been selected, ground would be applied to lead T via relay 31BF to cause relay 10LS to operate as the diode bridge associated with relay 10LS causes relay 10LS to operate with ground on either the T lead or the R lead.

Thereafter, the register-sender group and the register junctor are disconnected which thereby causes relay 10BY and relay 10CO to restore, removing the resistance battery connection to lead RS without interfering with the talking path for the calling and called subscribers due to the spark suppression circuit of the resistor R6 and capacitor C3 shunted across the contacts of relay 10CO. The removal of the resistance battery connection from lead RS is in effect removing a shunt from the lower winding of relay 30BF, thereby creating a higher impedance holding path for relay 10LS. Thereafter, relay 10LS remains operated across leads TS and RS to the battery feed relay 30BF as only a relatively lower amount of current is necessary to hold relay 10LS operated. Relay 10LS remains operated as long as the talking path is established between the calling and called subscribers, unless the wire-chief test desk releases the wire-chief junctor 1000, which would cause relay 10B to restore to thereby open the circuit to relay 10LS. Should this eventuality occur, the spark suppression circuit which includes capacitor C2 and resistor R5 would prevent any interference with the talking path between the calling and called subscriber.

Once the calling subscriber's line becomes idle, relay 33CN removes the battery feed relays 30BF and 31BF from the line, thereby causing relay 10LS to restore. Relay 10LS restores which causes relay 10LBY to restore. Relay 10LBY restores to allow relay 10EC to operate, thereby transmitting a ground signal via lead ECC over the step-by-step switch train to the wire-chief test desk to designate that calling subscriber 2401 has become idle.

While I have described above the principles of my invention in connection with specific apparatus, it is to be clearly understood that this description is made only by way of example and not as a limitation to the scope of my invention.

What is claimed is:

1. In a communication switching system, a plurality of switching stages for extending a set of communication conductors between calling and called lines and for coupling a first polarity pole of a source of direct current power through a first relatively high impedance inductor to a first conductor of said set and a second polarity pole of said source through a second relatively high impedance inductor to a second conductor of said set to thereby supply current to said set of conductors:

a supervisory unit and first coupling means to selectively couple the supervisory unit to a set of busy communication conductors to designate a change of condition in said conductors from busy to idle, the supervisry unit including a loop-sensing relay and a relay coupling means to electrically couple said relay in parallel with the set of busy communication conductors and to couple a shunt circuit in parallel with said second inductor for reducing the impedance in the operate circuit to the relay so that said relay operates and thereby changes to a busy state in response to the current flow in said operate circuit comprising said first inductor and the winding of said relay to said shunt circuit without substantially affecting the current supplied to said set of busy communication conductors, said relay coupling means being arranged to remove said shunt circuit from said second inductor after said relay has operated so that said relay remains operated in parallel with said set of busy communication conductors over a relatively higher impedance operate circuit to thereby remain operated until said set of busy conductors changes from a busy condition to an idle condition.

2. In a communication switching system, the combination as claimed in claim 1:

wherein said relay coupling means includes a line-busy relay to operate in response to the busy condition of the communication conductors, thereby coupling said loop-sensing relay to said busy communication conductors; and a control relay to couple said shunt circuit via relay contacts of the control relay in parallel with said second inductor and to restore after said loop-sensing relay has operated.

3. In a communication switching system, the combination as claimed in claim 2:

further includes a series circuit comprising a resistor and capacitor connected in parallel with said relay contacts of the control relay to substantially suppress electrical interference with the busy communication conductors upon the restoration of the control relay.

4. In a communication switching system, the combination as claimed in claim 1:

wherein said relay coupling means includes a diode-bridge circuit coupled from the busy communication conductors to the loop-sensing relay so that said loop-sensing relay operates irrespective of the relative polarity of the set of communication conductors.

5. In a communication switching system, the combination as claimed in claim 1:

wherein said relay coupling means further includes a hold relay to operate in response to seizure of the supervisory unit, thereby opening the operate circuit to the loop-sensing relay via relay contacts of the hold relay in response to the supervisory unit returning to an idle condition.

6. In a communication switching system, the combination as claimed in claim 5:

further includes a series circuit comprising a resistor and capacitor connected in parallel with said relay contacts of the hold relay to substantially suppress electrical interference with the busy communication conductors upon the restoration of the hold relay.

7. In a communication switching system, the combination as claimed in claim 1:

wherein said first and second relatively high impedance inductors are battery-feed relay windings.

References Cited by the Examiner

UNITED STATES PATENTS 2,796,466 6/1957 Molnar ------------- 179—27

KATHLEEN H. CLAFFY, *Primary Examiner.*

L. A. WRIGHT, *Assistant Examiner.*